United States Patent [19]
Ogawa

[11] Patent Number: 5,907,013
[45] Date of Patent: May 25, 1999

[54] METHOD FOR MANUFACTURING A CHEMICALLY ADSORBED FILM AND A CHEMICAL ADSORBENT SOLUTION FOR THE METHOD

[75] Inventor: Kazufumi Ogawa, Nara, Japan

[73] Assignee: Matsushita Electric Industrial Co., Ltd., Osaka, Japan

[21] Appl. No.: 09/119,252

[22] Filed: Jul. 20, 1998

Related U.S. Application Data

[62] Division of application No. 08/661,734, Jun. 11, 1996, Pat. No. 5,849,369.

[30] Foreign Application Priority Data

Jun. 14, 1995 [JP] Japan .................................. 7-147851

[51] Int. Cl.⁶ ................................ C08J 3/00; C08K 5/00
[52] U.S. Cl. ........................... 524/730; 524/755; 524/795
[58] Field of Search .................................. 524/730, 755, 524/795

[56] References Cited

U.S. PATENT DOCUMENTS

| | | |
|---|---|---|
| 4,746,366 | 5/1988 | Philipp et al. . |
| 5,338,579 | 8/1994 | Ogawa et al. . |
| 5,372,851 | 12/1994 | Ogawa et al. . |
| 5,435,839 | 7/1995 | Ogawa . |
| 5,468,551 | 11/1995 | Ogawa . |

FOREIGN PATENT DOCUMENTS

| | | |
|---|---|---|
| 0 497 189 A2 | 5/1992 | European Pat. Off. . |
| 0 493 747 A2 | 8/1992 | European Pat. Off. . |
| 3828098 | 3/1990 | Germany . |
| 4303570 | 8/1994 | Germany . |
| 3100060 | 4/1991 | Japan . |

*Primary Examiner*—Erma Cameron
*Attorney, Agent, or Firm*—Morrison & Foerster LLP

[57] ABSTRACT

The methods of forming a chemically adsorbed film by contacting a substrate with a solution mixture containing an alkoxysilane surface active agent, a non-aqueous solvent and a silanol-condensing catalyst to form a film covalently bonded to the substrate via siloxane bonds. These methods do not generate hydrochloric acid gas in forming the films and allow practical reaction rates.

8 Claims, 7 Drawing Sheets

METHOD FOR MANUFACTURING A CHEMICALLY ADSORBED FILM AND A CHEMICAL ADSORBENT SOLUTION FOR THE METHOD

This application is a division of Ser. No. 08/661,734, filed Jun. 11, 1996, now U.S. Pat. No. 5,849,369.

FIELD OF THE INVENTION

This invention relates to a method for manufacturing a chemically adsorbed film on the surface of a substrate comprising active hydrogens via siloxane bonding and a chemically adsorbent solution for using therefor. More particularly, this invention relates to a method for manufacturing a chemically adsorbed film using an alkoxysilane surface active agent, a nonaqueous solvent and a silanol condensing catalyst and a chemical adsorbent solution using therefor.

BACKGROUND OF THE INVENTION

The surface of the substrate such as plastic, metal, ceramics, fiber, woods, concrete, paint or the like have been treated for improved use in a variety of fields. For example, a method for treating a surface containing macromolecules includes; coating with a fluorosilane coupling agent to provide water and oil repellancy; coating with a wax to provide lubrication; coating with a polyvinyl alcohol to provide hydrophilicity; and coating with a suspension of a fluorocarbon-based polymer in order not to catch dirt on the surface of a substrate. The above-mentioned methods are recognized in the field.

However, coating films of the prior art have a relatively weak binding strength to the substrates containing macromolecules. Consequently, if the substrates are wiped by a cloth or washed repeatedly, coating films are peeled off from the substrate and lose the finishing effect. Moreover, coating films of the prior art have a large number of pin-holes on their surfaces because molecules arrange in various directions therein, thus deteriorating the property. Moreover, fluorocarbon-based polymer coating films are deficient in transparency so that they cannot be used for the treatment of optical materials that require transparency.

Methods for manufacturing chemically adsorbed monomolecular films are suggested by the inventor of this invention. See, for example, Japanese Laid-Open Patent No. (Tokkai-Hei) 4-132637, Japanese Laid-Open Patent No. (Tokkai-Hei) 4-221630, Japanese Laid-Open Patent No. (Tokkai-Hei) 4-367721 which are incorporated by reference. Such films are free from peeling off from the substrates, being pin-hole free, having thickness on the order of nanometers, and having a high transparency, in other words, transparency and lustering properties.

However, according to the conventional method for manufacturing chemically adsorbed films, the films were formed by a dehydrochloric reaction between a chlorosilane-based surface active agent and the surface of a substrate. Consequently, harmful hydrochloric acid gas can generate during the formation of such films. Also certain methods have attempted to form films by a dealcoholic reaction by way of an alkoxysilane surface active agents. However, since this reaction proceeds slowly, films are not easily formed. The method of using a dealcohol catalyst is also possible, but the surface active agent cross-links with the moisture content in the air and loses the activity if only the dealcohol catalyst is added. In other words, if the finishing agent includes moisture, the surface active agent cross-links before reacting to the surface of the substrate so that the reaction at the interface of solid and liquid is prevented, thus making chemically adsorption difficult.

SUMMARY OF THE INVENTION

To solve the above-noted problems, the invention aims to provide a method of forming a chemically adsorbed film which allows practical reaction rates and does not generate hydrochloric acid gas in forming the films.

To attain the above aim, the invention provides a first method of forming a chemically adsorbed film on a substrate having an active hydrogen, comprising the step of contacting the substrate with a solution mixture containing an alkoxysilane surface active agent, an active hydrogen-free nonaqueous solvent and silanol condensing catalyst to form a chemically adsorbed film covalently bonded to a surface of the substrate via siloxane bonding. The term "active hydrogen-free nonaqueous solvent" relates to a nonaqueous solvent containing substantially no active hydrogen. Preferably, it is free of all active hydrogen. The nonaqueous solvents can include any solvents other than water.

The first method can comprise contacting the substrate with the solution mixture containing the alkoxysilane surface active agent, the active hydrogen-free nonaqueous solvent and the silanol condensing catalyst, covalently bonding the alkoxysilane surface active agent to the surface of the substrate via a siloxane bond, and washing the substrate with a nonaqueous solvent to form a monomolecular coating film covalently bonded to the surface of the substrate via a siloxane bond. This method efficiently forms a monomolecular film made from the surface active agent, and the film is covalently bonded to the surface of the substrate via siloxane bonds.

The first method can also comprise contacting the substrate with a solution mixture containing the alkoxysilane surface active agent, the active hydrogen-free non aqueous solvent and the silanol condensing catalyst, covalently bonding the alkoxysilane surface active agent to the surface of the substrate via siloxane bonds, evaporating the nonaqueous solvent, and subjecting the substrate and the alkoxysilane surface active agent to a reaction with water to form a coating of a polymer film covalently bonded to the surface of the substrate via siloxane bonds. This method efficiently forms a polymer coating film made from the surface active agent, and the film is covalently bonded to the surface of the substrate via siloxane bonds.

The invention further provides a second method comprising the steps of contacting the substrate with a solution mixture containing a first alkoxysilane surface active agent, an active hydrogen-free nonaqueous solvent and a silanol condensing catalyst to form an inner layer which is a siloxane chemically adsorbed film covalently bonded to a surface of the substrate via a siloxane bond, and contacting the inner layer with a solution mixture containing at least a second alkoxysilane surface active agent, an active hydrogen-free nonaqueous solvent and a silanol condensing catalyst to form an outer layer made from a second alkoxysilane surface active agent and covalently bonded to a surface of the inner layer via a siloxane bond. In this embodiment, the first alkoxysilane surface active agent is preferably at least one selected from the group consisting of hexaalkoxy disiloxane, octaalkoxy trisiloxane, dialkoxysilane, trialkoxysilane and tetraalkoxysilane. This method efficiently forms a bi-layer chemically adsorbed film having an inner layer which is a chemically adsorbed monomolecular film of siloxane and an outer layer which is a chemically adsorbed monomolecular film from the second alkoxysilane surface active agent.

The second method can comprise contacting the substrate with the solution mixture containing the first alkoxysilane surface active agent, the active hydrogen-free nonaqueous solvent and the silanol condensing catalyst, covalently bonding the first alkoxysilane surface active agent to the surface of the substrate via a siloxane bond, washing the substrate with a nonaqueous solvent to form the inner layer which comprises a siloxane and is a chemically adsorbed monomolecular film covalently bonded to a surface of the substrate via a siloxane bond and then contacting the substrate covered with the inner layer with a solution mixture containing the second alkoxysilane surface active agent, the active hydrogen-free nonaqueous solvent and the silanol condensing catalyst, covalently bonding the second alkoxysilane surface active agent to the surface of the inner layer via a siloxane bond, and washing the substrate with a nonaqueous solvent to form an outer layer made from the second alkoxysilane surface active agent and covalently bonded to a surface of the inner layer via a siloxane bond. The first alkoxysilane surface active agent is preferably at least one selected from the group consisting of hexaalkoxy disiloxane, octaalkoxy trisiloxane, dialkoxysilane, trialkoxysilane and tetraalkoxysilane. This method efficiently forms a chemically adsorbed bi-layer film having an inner layer which is a chemically adsorbed monomolecular film made from siloxane and an outer layer which is a chemically adsorbed monomolecular film made from a second alkoxysilane surface active agent.

The second method can also comprise contacting the substrate with a solution mixture containing the first alkoxysilane surface active agent, the active hydrogen-free nonaqueous solvent and the silanol condensing catalyst, covalently bonding the first alkoxysilane surface active agent to the surface of the substrate via a siloxane bond, washing the substrate with a nonaqueous solvent to form a siloxane inner layer and covalently bonded to a surface of the substrate via a siloxane bond and then, contacting the substrate with a solution mixture containing at least the second alkoxysilane surface active agent, the active hydrogen-free nonaqueous solvent and the silanol condensing catalyst, covalently bonding the second alkoxysilane surface active agent to the surface of the inner layer via a siloxane bond, evaporating the nonaqueous solvent on the substrate, and subjecting an alkoxy group in the second alkoxysilane surface active agent remaining on the surface of the inner layer to a reaction with water to form an outer layer made from the second alkoxysilane surface active agent and covalently bonded to a surface of the inner layer via a siloxane bond. The first alkoxysilane surface active agent is preferably at least one selected from the group consisting of hexaalkoxy disiloxane, octaalkoxy trisiloxane, dialkoxysilane, trialkoxysilane and tetraalkoxysilane. This method efficiently forms a bi-layer chemically adsorbed film having an inner layer which is a chemically adsorbed monomolecular film of siloxane and an outer layer which is a chemically adsorbed polymer film from the second alkoxysilane surface active agent.

The second method can also comprise contacting the substrate with a solution mixture containing the first alkoxysilane surface active agent, the active hydrogen-free nonaqueous solvent and the silanol condensing catalyst, covalently bonding the first alkoxysilane surface active agent to the surface of the substrate via a siloxane bond, evaporating the nonaqueous solvent on the substrate, subjecting an alkoxy group in the second alkoxysilane surface active agent remaining on the surface of the substrate to a reaction with water to form an inner layer which comprises a polysiloxane and is a film covalently bonded to a surface of the inner layer via a siloxane bond, contacting the substrate with the solution mixture containing at least the second alkoxysilane surface active agent, the active hydrogen-free nonaqueous solvent and the silanol condensing catalyst, covalently bonding the second alkoxysilane surface active agent to the surface of the inner layer via a siloxane bond, and washing the substrate-and the second alkoxysilane surface active agent with a nonaqueous solvent to form the outer layer made from the second alkoxysilane surface active agent and covalently bonded to the surface of the substrate via a siloxane bond. The first alkoxysilane surface active agent is preferably at least one selected from the group consisting of hexaalkoxy disiloxane, octaalkoxy trisiloxane, dialkoxysilane, trialkoxysilane and tetralkoxysilane. This method efficiently forms a bi-layer chemically adsorbed film having an inner layer which comprises polysiloxane and an outer layer which is a chemically adsorbed monomolecular film from the second alkoxysilane surface active agent.

The second method can also comprise contacting the substrate with a solution mixture containing the first alkoxysilane surface active agent, the active hydrogen-free nonaqueous solvent and the silanol condensing catalyst, covalently bonding the first alkoxysilane surface active agent to the surface of the substrate via a siloxane bond, evaporating the nonaqueous solvent, subjecting an alkoxy group in the first alkoxysilane surface active agent remaining on the surface of the substrate to a reaction with water to form the inner layer which comprises polysiloxane and is a film covalently bonded to the surface of the substrate via a siloxane bond, contacting the substrate with the solution mixture containing at least the second alkoxysilane surface active agent, the active hydrogen-free nonaqueous solvent and the silanol condensing catalyst, covalently bonding the second alkoxysilane surface active agent to the surface of the inner layer via a siloxane bond, evaporating the nonaqueous solvent on the substrate, and subjecting an alkoxy group in the second alkoxysilane surface active agent remaining on the surface of the inner layer to a reaction with water to form the outer layer made from the second alkoxysilane surface active agent and covalently bonded to the surface of the inner layer. The first alkoxysilane surface active agent is preferably at least one selected from the group consisting of hexaalkoxy disiloxane, octaalkoxy trisiloxane, dialkoxysilane, trialkoxysilane and tetralkoxysilane. This method efficiently forms a bi-layer chemically adsorbed film having an inner layer which comprises polysiloxane and an outer layer which is a polymer film from the second alkoxysilane surface active agent.

The invention further provides a third method comprising the step of contacting a substrate with a solution mixture containing a silane surface active agent, an active hydrogen-free nonaqueous solvent and a silanol condensing catalyst to form a chemically adsorbed film which comprises a siloxane and is covalently bonded to a surface of the substrate via a siloxane bond. The silane surface active agent is preferably at least one selected from the group consisting of hexaalkoxy disiloxane, octaalkoxy trisiloxane, dialkoxysilane, trialkoxysilane and tetralkoxysilane. This method efficiently forms a hydrophilic chemically adsorbed thin film comprising siloxane.

The third method can comprise contacting the substrate with the solution mixture containing the silane surface active agent, the active hydrogen-free nonaqueous solvent and the silanol condensing catalyst, covalently bonding the silane surface active agent to the surface of the substrate via a siloxane bond, and washing the substrate with a nonaqueous solvent to form a chemically adsorbed monomolecular film which comprises a siloxane and is covalently bonded to the surface of the substrate via a siloxane bond. The silane surface active agent is preferably at least one selected from the group consisting of hexaalkoxy disiloxane, octaalkoxy trisiloxane, dialkoxysilane, trialkoxysilane and tetralkoxysilane. This method efficiently forms a hydrophilic monomolecular film comprising siloxane.

The third method can also comprise contacting the substrate with the solution mixture containing the silane surface active agent, the active hydrogen-free nonaqueous solvent and the silanol condensing catalyst, covalently bonding the silane surface active agent to the surface of the substrate via a siloxane bond, evaporating the nonaqueous solvent on the substrate, and subjecting an alkoxy group in the silane surface active agent remaining on the surface of the substrate to a reaction with water to form a film which comprises a polysiloxane and is a film covalently bonded to the surface of the substrate via a siloxane bond, and the silane surface active agent is preferably at least one selected from the group consisting of hexaalkoxy disiloxane, octaalkoxy trisiloxane, dialkoxysilane, trialkoxysilane and tetralkoxysilane. This method efficiently forms a hydrophilic polymer film comprising siloxane.

The silanol condensing catalyst is preferably at least one substance selected from the group consisting of metal carboxylate, carboxylic acid ester metal salt, metal carboxylate polymer, metal carboxylate chelate, titanic ester and titanic ester chelate. These catalysts have good catalytic activity. Examples of such catalysts include tin (I) acetate, dibutyl tin dilaurate, dibutyl tin dioctate, dibutyl tin diacetate, dioctyl tin dilaurate, dioctyl tin dioctate, dioctyl tin diacetate, tin (I) dioctanate, lead naphthenate, cobalt naphthenate, iron 2-ethyl hexenoic acetate, dioctyl tin bis-octyl thioglycollic acid ester salt, dioctyl tin maleic acid ester salt, dibutyl tin maleic acid polymer, dimethyl tin mercapto propionic acid salt polymer, dibutyl tin bis-acetyl acetonate, dioctyl tin bis-acetyl laurate, tetrabutyl titanate, tetranonyl titanate and bis-(acetylacetonyl) di-propyltitanate. The catalysts can be used either alone or in combination.

The silane surface active agent preferably comprises a fluorocarbon group. Such silane surface active agents comprising a fluorocarbon group provides secondly formed, e.g., outer layers with properties of water, oil and dirt repellancy. Examples of such silane surface active agents include substances represented by one formula selected from the following two formulas:

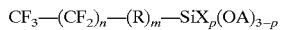

$CF_3-(CF_2)_n-(R)_m-SiX_p(OA)_{3-p}$ wherein n is 0 or an integer, R represents an alkylene group, vinylene group, ethynylene group, arylene group, or a substituent containing a silicon atom or oxygen atom, m is 0 or 1, X represents an hydrogen atom, alkyl group, alkoxy group, fluorine-containing alkyl group or fluorine-containing alkoxy group, A represents an alkyl group, and p is an integer of 0, 1 or 2; and

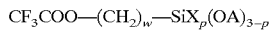

$CF_3COO-(CH_2)_w-SiX_p(OA)_{3-p}$ wherein w is an integer, X represents an hydrogen atom, alkyl group, alkoxy group, fluorine-containing alkyl group or fluorine-containing alkoxy group, A represents an alkyl group, and p is an integer of 0, 1 or 2.

The substrate preferably comprises at least one material selected from the group consisting of metal, ceramic, glass, plastic, paper, fabric and leather. When formed of, e.g., plastic or synthetic fiber fabric, the substrate preferably has been made hydrophilic by treating the substrate either with a plasma containing oxygen or in a corona atmosphere. The treatment allows molecules of the surface active agents to fix on the substrates in high concentrations.

The nonaqueous solvent is preferably a water-free solvent comprising a hydrocarbon or a water-free solvent comprising a fluorocarbon. Fluorocarbon-based solvents, especially, are easy to use because they are less harmful. The term "water-free solvent" relates to a solvent containing substantially no water.

The invention further provides a chemical adsorbent solution comprising a solution mixture containing an alkoxysilane surface active agent, an active hydrogen-free nonaqueous solvent and a silanol condensing catalyst. The chemical adsorbent solution can contain other ingredients as long as the ingredient does not inhibit catalytic reaction.

The silanol condensing catalysts disclosed above are also available for the chemical adsorbent solution of the invention.

The chemical adsorbent solution of the invention can also contain the alkoxysilane surface active agent comprising a fluorocarbon group, specifically substances represented by one formula selected from the above-mentioned two formulas.

The chemical adsorbent solution of the invention can also contain nonaqueous solvents selected from, for example, water-free solvents comprising a hydrocarbon and a water-free solvent comprising a fluorocarbon, and silicone solvents or the mixture.

The chemical adsorbent solution of the invention preferably has a water content of 10 ppm or less. The low water content is helpful for keeping stabilities of alkoxysilane surface active agents and silanol condensing catalysts and for keeping pot life of the chemical adsorbent solution.

It is preferable in the chemical adsorbent solution of the invention that 100 weight parts of the solution mixture comprises 0.1 to 30 weight parts of the alkoxysilane surface active agent, 0.0001 to 7.5 weight parts of the silanol condensing catalyst, and 62.5 to 99.8999 weight parts of the active hydrogen-free nonaqueous solvent.

The invention is capable of providing method for forming a chemically adsorbed film which allows practical reaction rates and does not generate acid gas in forming the films. When the surface of substrates is treated with hexaalkoxydisiloxane, octaalkoxytrisiloxane, dialkoxysilane, trialkoxysilane or tetraalkoxysilane prior to the formation of chemically adsorbed films, high density of silanol bonds can be provided on the surface of the substrates. Preferable silanol condensing catalysts are metal carboxylate, carboxylic acid ester metal salt, metal carboxylate polymer, metal carboxylate chelate, titanic ester or titanic ester chelate. Those catalysts can be more useful than acid catalysts in controlling reaction rate. The alkoxysilane surface active agents comprising a fluorocarbon group improves water- and oil-repellent properties of the obtained coating films. In particular, substances represented by the above two formulas allow the formation of chemically adsorbed films with high density. Further, the water-free hydrocarbon-based nonaqueous solvents or the water-free fluorocarbon-based nonaqueous solvents allow the formation of chemically adsorbed films with high density without decreasing catalytic activities of the catalysts. The fluorocarbon-based nonaqueous solvents are particularly useful for forming polymer films because the solvents have a low specific heat and evaporate quickly.

When a substrate such as plastic and synthetic fiber fabric has little active hydrogen atoms on its surface, the substrate is preferably treated either with a plasma containing oxygen or in a corona atmosphere to make the surface hydrophilic. The treatment allows the formation of chemically adsorbed films on the surface of polymers. It was relatively difficult for conventional methods to form chemically adsorbed films on the polymers.

The chemical adsorbent solution of the invention realizes a useful chemical adsorbent solution.

DETAILED DESCRIPTION OF THE INVENTION

Figure 1A:
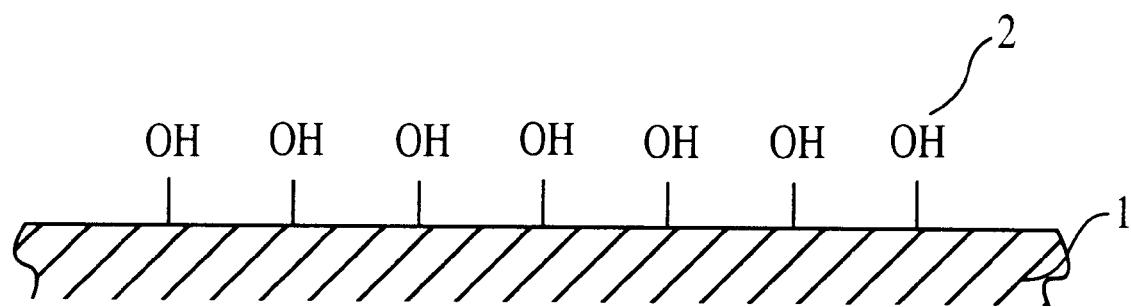
FIGS. 1(a) and 1(b) are a cross-sectional view of the surface of a substrate, enlarged to a molecular level, explaining the process of finishing the surface in Example 1 of the invention.

The invention will be explained in detail with reference to the attached figures and following examples.

This invention can be applicable for various uses and materials such as described:

(a) examples of substrates—metal, ceramics, plastic, wood, stone (the invention being applicable even when the substrate surface is coated with paint or the like in advance);

(b) examples of cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) examples of needles—acupuncture needle, sewing needle, sewing-machine needle, long thick needle for making tatami, syringe needle, surgical needle, safety pin or the like;

(d) examples of products in the pottery industry—products made of pottery, glass, ceramics or enameled products, including hygienic potteries (such as a chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pots and pans;

(e) examples of mirrors—hand mirror, full-length mirror, bathroom mirror, washroom mirror, mirrors for automobile (back and side mirrors), half mirror, mirror for show window, mirrors for department store or the like;

(f) examples of molding parts—die for press molding, die for cast molding, die for injection molding, die for transfer molding, die for vacuum molding, die for blow forming, die for extrusion molding, die for inflation molding, die for fiber spinning, calender processing roll;

(g) examples of ornaments—watch, jewelry, pearl, sapphire, ruby, emerald, garnet, cat's-eye, diamond, topaz, bloodstone, aquamarine, turquoise, agate, marble, amethyst, cameo, opal, crystal, glass, ring, bracelet, brooch, tiepin, earrings, necklace, glasses frames (of patinum, gold, silver, aluminum, titanium, tin, compound metals of these elements, or stainless steel) or the like;

(h) examples of molds for food—cake mold, cookie mold, bread mold, chocolate mold, jelly mold, ice cream mold, oven plate, ice tray or the like;

(i) examples of cookware—pots and pans, iron pot, kettle, pot, frying pan, hot plate, net for grilling food, tool for draining off oil, plate for making takoyaki or the like;

(j) examples of paper—photogravure paper, water and oil repellent paper, paper for posters, high-quality paper for pamphlets or the like;

(k) examples of resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicon resin, ABS resin, methacrylic resin, ethylacrylate resin, ester resin, polyacetal, polyphenyleneoxide or the like;

(l) examples of household electric goods—television, radio, tape recorder, audio goods, CD player, refrigerator, freezer, air conditioner, juicer, blender, blade of an electric fan, lighting equipment, dial plate, hair drier for perm or the like;

(m) examples of sporting goods—skis, fishing rod, pole for pole vault, boat, sailboat, jet skis, surfboard, golf ball, bowling ball, fishing line, fishing net, fishing float or the like;

(n) examples of vehicle parts;

(1) ABS resin—lamp cover, instrument panel, trimming parts, and protector for a motorcycle, (2) cellulose plastic—markings for automobile, and steering wheel, (3) FRP (Fiber Reinforced Plastics)—bumper, and engine cover, (4) phenolic resin—brake, (5) polyacetal—wiper, wiper gear, gas valve, carburetor parts, (6) polyamide—radiator fan, (7) polyarylate (polycondensation polymerization by bisphenol A and pseudo phthalic acid)—direction indicator lamp (or lens), cowl board lens, relay case, (8) polybutylene terephthalate—rear end, front fender,
(9) poly amino-bismaleimide—engine parts, gear box, wheel, suspension drive system,
(10) methacrylate resin—lamp cover lens, meter panel and cover, and center mark,
(11) polypropylene—bumper,
(12) polyphenylene oxide—radiator grill, wheel cap,
(13) polyurethane—bumper, fender, instrument panel, and fan,
(14) unsaturated polyester resin—body, gas tank, heater housing, meter panel, (o) examples of stationary goods—fountain pen, ballpoint pen, mechanical pencil, pencil case, binder, desk, chair, book shelf, rack, telephone base, ruler, draftsman's outfit or the like;

(p) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processed wood, metallic material including aluminum, plastic material, paper, fiber, etc.) or the like;

(q) examples of stone materials—granite, marble or the like, used for building, building material, works of art, ornament, bath, gravestone, monument, gatepost, stone wall, sidewalk, paving stone, etc.

(r) examples of musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination repelling properties, including thermos bottles, vacuum apparatus, insulator for transmitting electricity, spark plugs or the like.

The invention will be explained in detail with reference to the attached figures and following examples. In the following Examples, % represents wt. %.

EXAMPLE 1

Figure 1B:
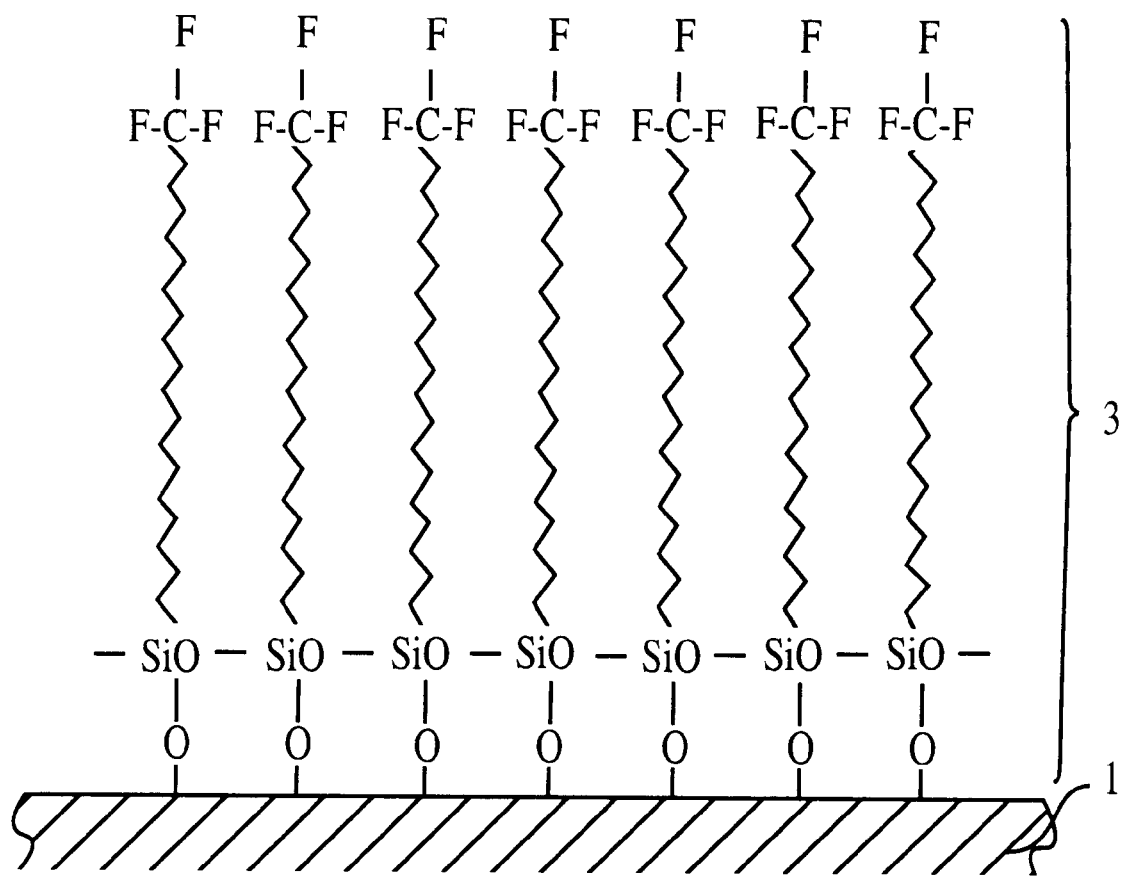

Chemically adsorbed monomolecular films 3 was formed by the following procedures:

preparing a blue glass plate 1 comprising active hydrogen on its surface and washing it with alkali detergent or the like and then degreasing by washing it in water (FIG. 1(a));

soaking the prepared glass plate 1 in chemical adsorbent solution consisting of $CF_3(CF_2)_7(CH_2)_2Si(OCH_3)_3$ containing fluorocarbon group (as an alkoxysilane surface active agent) in an amount of 5%, n-dibutyl tin diacetate of metal carboxylate (as a silanol condensing catalyst) in an amount of 0.1% and n-decane (as a nonaqueous liquid solvent containing no active hydrogens) in an amount of 94.9%, in a dry atmosphere at a relative humidity of 30% or less at the room temperature of 25° C. (the solution mixture can be heated at temperature of the boiling point of the nonaqueous solvent to be used herein ) for 2 hours;

taking the prepared glass plate out of the adsorbent solution and washing it well with chloroform; and reacting the substrate of the prepared glass plate to moisture content in the air, thereby forming one layer of water and oil repellent adsorbed monomolecular film 3 having thickness of approximately 1.5 nm on the surface of the glass plate 1 via covalent bonding of Si (FIG. 1(b)).

Moreover, the water and oil repelling property of the chemically adsorbed monomolecular film formed in the above-mentioned procedures was examined by measuring the contact angle. The result is shown in Table 1. As is apparent from Table 1, the water and oil repellent property of the chemically adsorbed monomolecular film which was treated by the method for manufacturing chemically adsorbed monomolecular film of the invention was hardly deteriorated even after rubbed with wet cloth 50000 times. According to the method of the invention, a coat having the high durability could be obtained.

Where catalyst is included in the chemical adsorbent solution as in this example, at the surface where adsorbent solution contact with the glass plate, the reaction proceeded by way of the alkoxysilane group (SiOR; R represents an alkyl group, e.g., a methyl group was used in this example) of alkoxysilane surface active agent, moisture content adsorbed to the surface of the glass plate and hydroxyl group 2 of the surface reacted (FIG. 1(a)). The reactions proceeded by way of Formula 1 and 2:

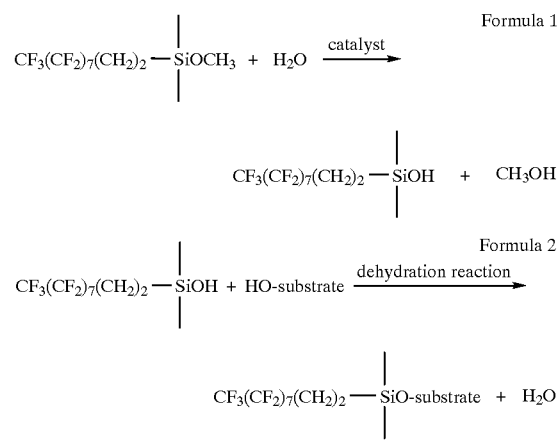

As a result of this treatment, at the interface between the surface of the glass plate and adsorbent solution, at least the alkoxysilane surface active agent was fixed to the surface of the glass plate via covalent bonding of Si atom, thus forming an ultra thin protecting film. As is apparent from Formula 1 and Formula 2, water plays an important role. In other words, if the finishing agent contains water, the finishing agent cross-links before reacting to the surface of a substrate. Consequently, the reaction at the interface between the solid and liquid is interrupted so that a chemically adsorbed film is not properly formed. For this reason, the water content in the chemical adsorbent solution should be as small as possible. It is preferable that the water content is not more than 10 ppm. When the reaction mentioned above was completed, unreacted chemical adsorbent solution on the glass surface was washed and removed by a nonaqueous solvent. Consequently, only a monomolecular film made from alkoxysilane surface active agent molecules fixed to the surface of the glass plate via covalent bonding of Si atom remained, thus forming one layer of chemically adsorbed monomolecular film 3.

The alkoxysilane surface active agent of the invention can include agents represented by $SiX_p(OA)_{4-p}$ (wherein X represents H, an alkyl group, alkoxyl group, or a substituent comprising a fluoroalkyl or fluoroalkoxy group; A represents an alkyl group; and p represents 0, 1, 2 or 3) can be used. Moreover, compounds represented by, for example, $CF_3$—$(CF_2)_n$—$(R)_m$—$SiX_p(OA)_{3-p}$ (wherein n represents 0 or an integer; R represents an alkylene, vinylene, ethynylene, arylene group or a substituent comprising a silicon or oxygen atom; m represents 0 or 1; and X represents H, an alkyl, alkoxyl or a substituent comprising a fluoroalkyl or fluoroalkoxy group; A represents an alkyl group; and p represents 0, 1 or 2) can provide a coat having an excellent water and oil repellent property. However, other agents can be used for alkoxysilane surface active agent. Examples of the suitable agents includes: $CH_3-(CH_2)_r-SiX_p(OA)_{3-p}$; $CH_3-(CH_2)_s-O-(CH_2)_t-SiX_p(OA)_{3-p}$; $CH_3-(CH_2)_u-Si(CH_3)_2-(CH_2)_v-SiX_p(OA)_{3-p}$; $CF_3COO-(CH_2)_w-SiX_p(OA)_{3-p}$; wherein r represents 1 to 25; s represents 0 to 12; t represents 1 to 20; u represents 0 to 12; v represents 1 to 20; w represents 1 to 25; X represents H, an alkyl, alkoxyl or a substituent comprising a fluoroalkyl or fluoroalkoxy group; A represents an alkyl group; and p represents 0, 1 or 2.

Specific examples of the agents include;
$CH_3CH_2O(CH_2)_{15}Si(OCH_3)_3$,
$CF_3CH_2O(CH_2)_{15}Si(OCH_3)_3$,
$CH_3(CH_2)_2Si(CH_3)_2(CH_2)_{15}Si(OCH_3)_3$,
$CH_3(CH_2)_6Si(CH_3)_2(CH_2)_9Si(OCH_3)_3$,
$CH_3COO(CH_2)_{15}Si(OCH_3)_3$,
$CF_3(CF_2)_5(CH_2)_2Si(OCH_3)_3$,
$CF_3(CF_2)_7-C_6H_6-Si(OCH_3)_3$,
$CH_3CH_2O(CH_2)_{15}Si(OC_2H_5)_3$,
$CH_3(CH_2)_2Si(CH_3)_2(CH_2)_{15}Si(OC_2H_5)_3$,
$CH_3(CH_2)_6Si(CH_3)_2(CH_2)_9Si(OC_2H_5)_3$,
$CF_3(CH_2)_6Si(CH_3)_2(CH_2)_9Si(OC_2H_5)_3$,
$CH_3COO(CH_2)_{15}Si(OC_2H_5)_3$,
$CF_3COO(CH_2)_{15}Si(OC_2H_5)_3$,
$CF_3COO(CH_2)_{15}Si(OCH_3)_3$,
$CF_3(CF_2)_9(CH_2)_2Si(OC_2H_5)_3$,
$CF_3(CF_2)_7(CH_2)_2Si(OC_2H_5)_3$,
$CF_3(CF_2)_5(CH_2)_2Si(OC_2H_5)_3$,
$CF_3(CF_2)_7C_6H_6Si(OC_2H_5)_3$,
$CF_3(CF_2)_9(CH_2)_2Si(OCH_3)_3$,
$CF_3(CF_2)_5(CH_2)_2Si(OCH_3)_3$,
$CF_3(CF_2)_7(CH_2)_2SiCH_3(OC_2H_5)_2$,
$CF_3(CF_2)_7(CH_2)_2SiCH_3(OCH_3)_2$,
$CF_3(CF_2)_7(CH_2)_2Si(CH_3)_2OC_2H_5$
$CF_3(CF_2)_7(CH_2)_2Si(CH_3)_2OCH_3$.

It is preferable that the content of the alkoxysilane surface active agent in the solution mixture of the invention is 0.1–30%.

Particularly, if metal carboxylate and metal carboxylate chelate were used, a stable chemically adsorbed film could be obtained. Moreover, the preferable amount of silanol condensing to be added is 0.1–25% of the surface active agent.

Only if the dealcohol reaction using alkoxy group is required to be promoted, inorganic or organic acid can be used instead of silanol condensing catalyst. However, as noted above, it is not preferable that such acid includes water. Therefore, the silanol condensing catalyst is preferred.

Moreover, as a nonaqueous solvent containing in no active hydrogen is preferably selected from nonaqueous hydrocarbon-based solvents, fluorocarbon-based solvents and silicone-based solvent. Specifically, an agent having the boiling point of 100–250° C. is preferred. As other usable solvents, the following examples can be included; petroleum naphtha, solvent naphtha, petroleum ether, petroleum benzene, isoparaffin, n-paraffin, decalin, industrial gasoline, kerosene, ligroin, dimethylsilicone, phenylsilicone, alkyl modified silicone, polyether silicone. Moreover, as a fluorocarbon-based solvent, freon-based solvents, Fluorinert (product by 3M) and Afluid (product by Asahi Glass Co., Ltd) can be used. The above-noted examples can be used alone or in combinations thereof.

Figure 2A:
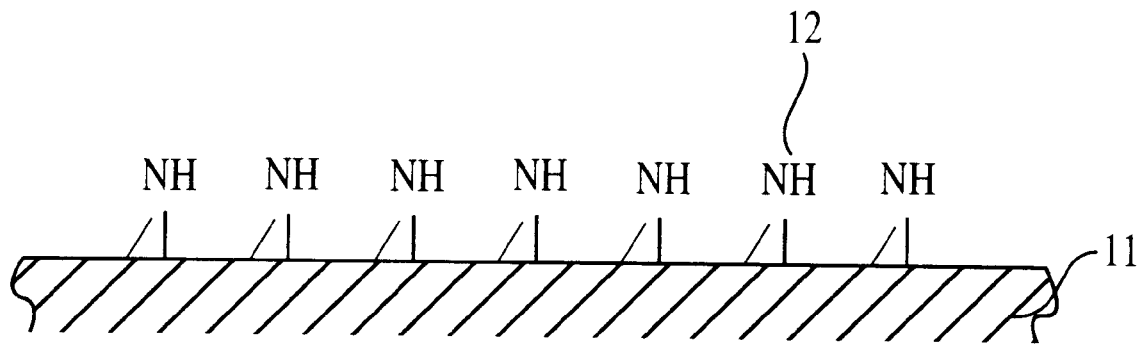
FIGS. 2(a) and 2(b) are a cross-sectional view of the surface of a substrate, enlarged to a molecular level, explaining the process of finishing the surface in Example 1 of the invention.
Figure 2B:
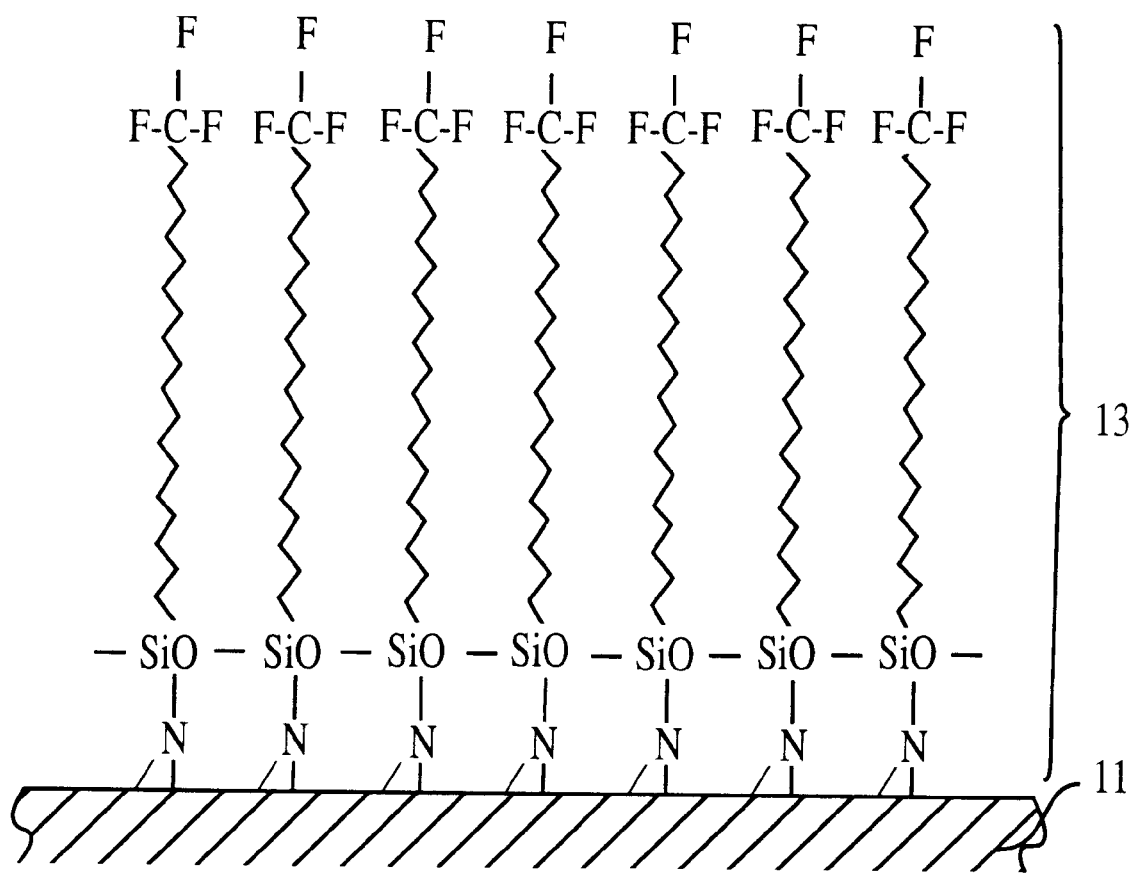

Examples of substrates usable for the invention include substrates having active hydrogen, e.g., hydroxyl groups, on their surfaces. Suitable materials include metals such as Al, Cu or stainless steel, and glass, ceramics, paper, natural fiber fabric, leather and other hydrophilic substrates. Hydroxyl groups can be introduced to the surface having no hydroxyl groups, such as plastic or synthetic fiber fabric, by treatment in a plasma atmosphere containing oxygen at 100 W for 20 minutes, or a corona treatment, thus making the surface hydrophilic. For hydrohpilic groups, in addition to hydroxyl groups (—OH), functional groups such as —COOH, —NH, =NH$_2$ or the like can be used. However, in case that polyamide resin and polyurethane resin having imino groups (—NH) on their surfaces can be used, above-mentioned treatment is not necessary because a dealcohol reaction is promoted between the active hydrogens of the imino groups (—NH) and the alkoxysilyl groups (—SiOA) of the chemical adsorbed film, thereby forming siloxane bonds (—SiO—). In the case that substrates are nylon or polyeurethane 11, imino groups 12 containing active hydrogen are exposed on the surfaces (FIG. 2(a)) and chemically adsorbed monomolecular film 13 was formed in the same manner of the glass plate (FIG. 2(b)).

EXAMPLE 2

Figure 3A:
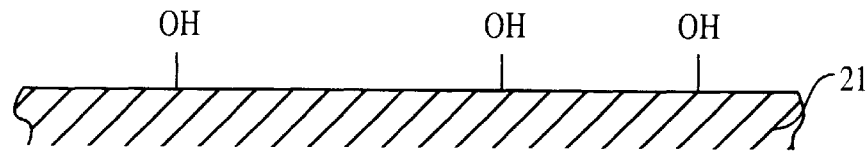
FIGS. 3(a), 3(b) and 3(c) are a cross-sectional view of the surface of a substrate, enlarged to a molecular level, explaining the process of finishing the surface in Example 2 of the invention.
Figure 3B:
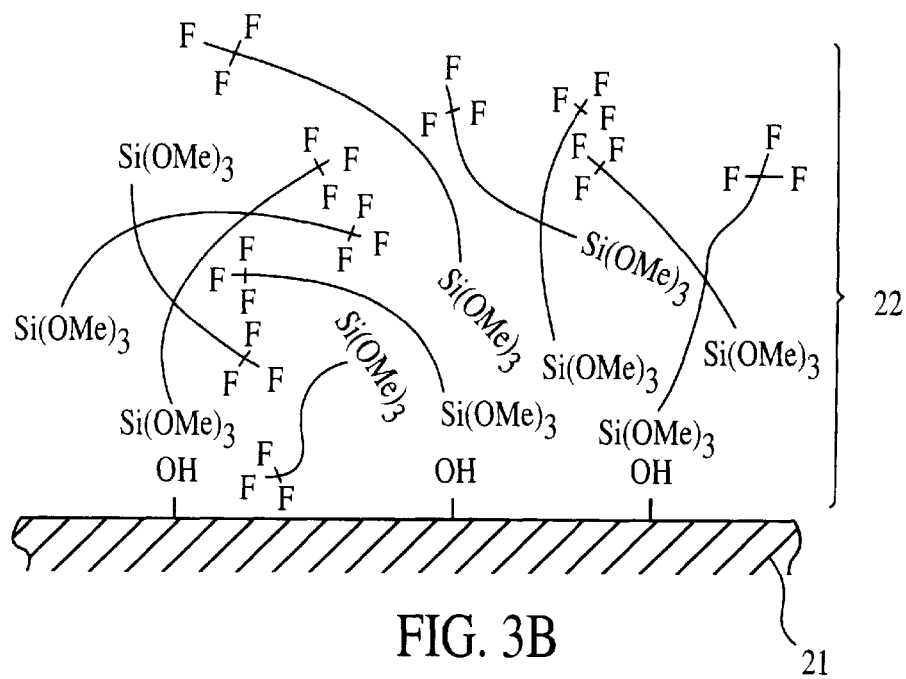
Figure 3C:
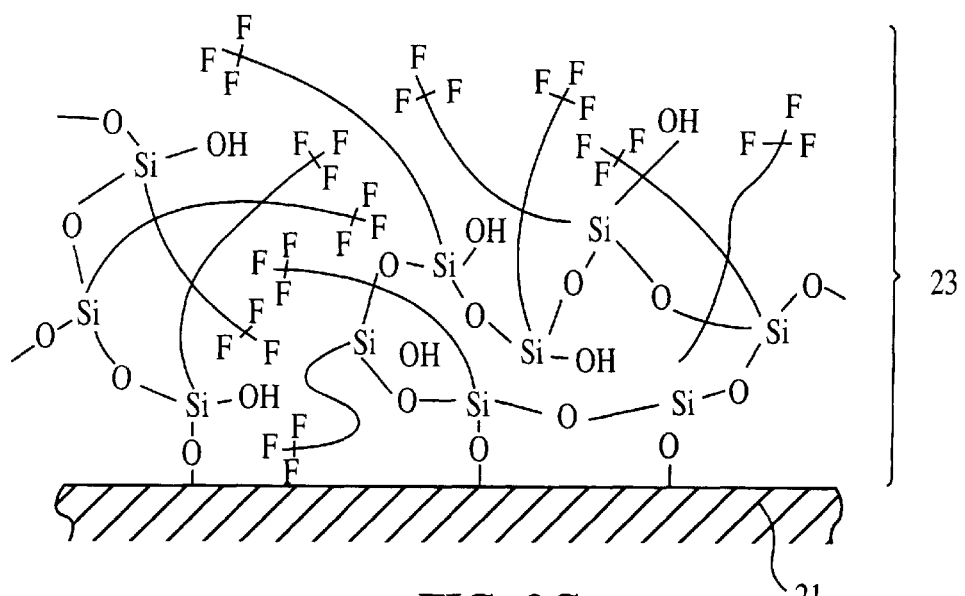

The polymer-state coat 23 was formed by the following procedures:

preparing a stainless steel plate 21 comprising active hydrogen on its surface and washing it with alkali detergent or the like and then degreasing by washing it in water (FIG. 3(a));

soaking the prepared plate in a chemical adsorbent solution, the mixture $CF_3(CF_2)_9(CH_2)_2Si(OCH_3)_3$ (as an alkoxysilane surface active agent) in an amount of 5%, n-dibutyl tin bis-acetyl acetonate of metal carboxylate chelate (as a silanol condensing catalyst) in an amount of 0.5% and Fluorinert FC-40 (product by 3M) (as a nonaqueous liquid solvent containing no active hydrogens) in an amount of 94.5%, in a gaseous nitrogen atmosphere for 10 minutes with heating the stainless plate 21 at a temperature of 70° C. for 10 minutes;

taking the prepared substrate out of the adsorbent solution and evaporating the above-mentioned adsorbent solution remaining on the surface of the plate, thus forming a coat 22 of alkoxysilane-based surface active agent containing silanol condensing catalyst on the substrate as in FIG. 3(b) (In this procedure, if adsorbent solution was heated, the evaporation time could be shortened.); and then reacting the substrate to moisture content in the air, thereby forming one layer of water and oil repellent polymer coating 23 having thickness of approximately 5 nm on the surface of the stainless steel plate via covalent bonding of Si (FIG. 3(c)).

Moreover, the water and oil repelling property of the chemically adsorbed polymer film formed in this procedures was examined by the same manner as in Example 1. The result is shown in Table 1. As is apparent from Table 1, the contact angle of Example 2 was somewhat inferior to Example 1, the water and oil repellent property of the chemically adsorbed polymer film which was treated by the method for manufacturing chemically adsorbed film of the invention was hardly deteriorated even after rubbed with a wet cloth 50000 times. Thus, a coating having high durability was provided.

EXAMPLE 3

Figure 4A:
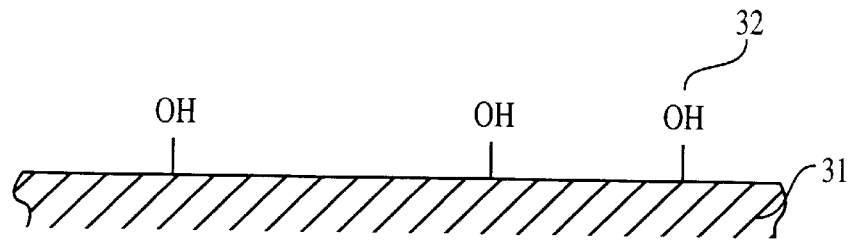
FIGS. 4(a), 4(b) and 4(c) are a cross-sectional view of the surface of a substrate, enlarged to a molecular level, explaining the process of finishing the surface in Example 3 of the invention.
Figure 4B:
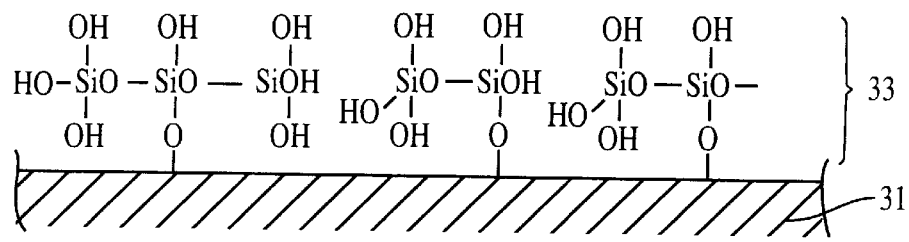

As a substrate, an acrylic resin plastic plate 31 was subjected to plasma treatment for 5 min at 300 W to clean the surface of the plate and to provide active hydrogen containing hydroxyl groups 32 (cf. FIG. 4(a)). As a chemical absorbent solution, a solution mixture was prepared by using 1% of hexamethoxydisiloxane, and 98.75% of fluorocarbon-based nonaqueous solvent Fluorinert FC-40 and 0.25% of dibutyl tin dioctate as a silanol-condensing catalyst. Hexamethoxydisiloxane is an alkoxy siloxane adsorbent. The solution mixture was applied to the surface of plastic plate 31 in dry atmosphere at a relative humidity of 25%. The plastic plate 31 was allowed to stand for 2 h at room temperature in dry atmosphere so as to chemically adsorb hexaalkoxysilane onto plastic plate 31. Plastic plate 31 was washed with a fluorocarbon-based non-aqueous solvent Fleon 113 (product by Daikin Industries Ltd). to remove excess adsorbent. Remaining unreacted alkoxy groups in the adsorbent were hydrolyzed to form an siloxane-based inner layer 33 covalently bonded to plastic plate 31 via siloxane bonds (cf. FIG. 4(b)). Inner layer 33 was a chemically adsorbed monomolecular film made from hexamethoxysiloxane. As illustrated in FIG. 4(b), the above processes provided plastic plate 31 with a number of hydroxyl groups containing active hydrogen.

The contact angle of water for the obtained monomolecular siloxane film 33 was measured in a conventional manner, and the contact angle was 30° or less. The surface of the film 33 was found to be hydrophilic.

Figure 4C:
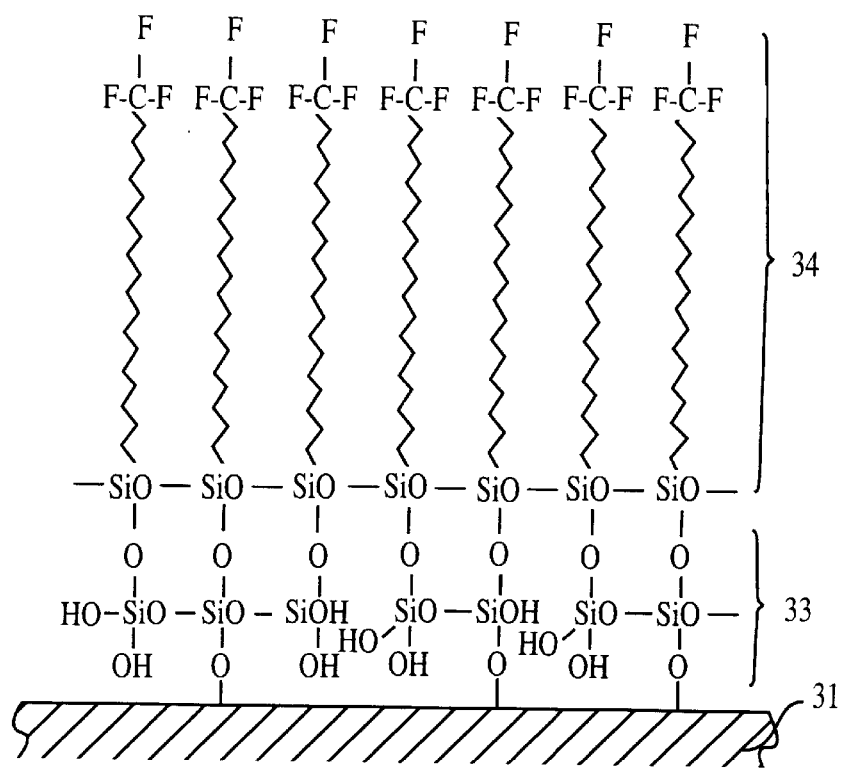

Secondly, another solution mixture was prepared by using alkoxysilane surface active agent $CF_3(CF_2)_7(CH_2)_2Si(OCH_3)_3$ in an amount of 5%, n-butyl tin diacetate as a silanol-condensing catalyst in an amount of 0.1% and non-aqueous solvent containing nonactive hydrogen Fluorinert FC-40 in an amount of 94.9%. N-butyl tin diacetate is a metal carboxylate. The processed plastic plate 31 was soaked in the solution mixture at room temperature for 12 h, in dry atmosphere at a relative humidity of 30% or less. In the soaking process, the solution mixture can be heated at a temperature of the boiling point of the non-aqueous solvent used or below. Plastic plate 31 was taken out of the adsorbent solution and washed well with the nonaqueous solvent Fluorinert FC-40 to form an outer layer 34 covalently bonded to plastic plate 31 via siloxane bonds in high density. The outer layer was a chemically adsorbed monomolecular film comprising $CF_3(CF_2)_7(CH_2)_2Si(O-)_3$ (cf. FIG. 4(c)).

The water- and oil-repellent properties of the obtained chemically adsorbed monomolecular accumulation layer was examined in the same manner as in Example 1. The results of the examination are shown in Table 1. As seen from Table 1, the water- and oil-repellent properties of the obtained film were hardly deteriorated even after the plate was repeatedly rubbed with a wet cloth and washed. The obtained film was found to be an extremely durable coating.

Instead of the surface active agent, hexamethoxydisiloxane, other agents such as octaalkoxytrisiloxane, dialkoxysilane, trialkoxysilane or tetraalkoxysilane could be also used to form similar inner layers.

EXAMPLE 4

Figure 5A:
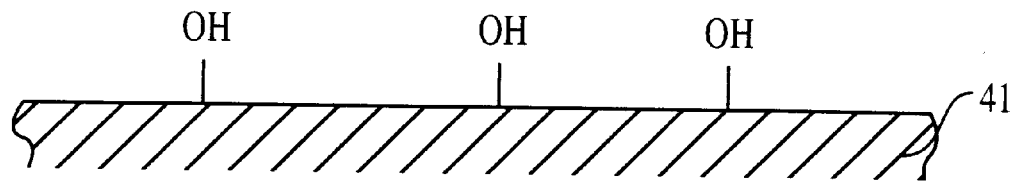
FIGS. 5(a), 5(b) and 5(c) are a cross-sectional view of the surface of a substrate, enlarged to a molecular level, explaining the process of finishing the surface in Example 4 of the invention.
Figure 5B:
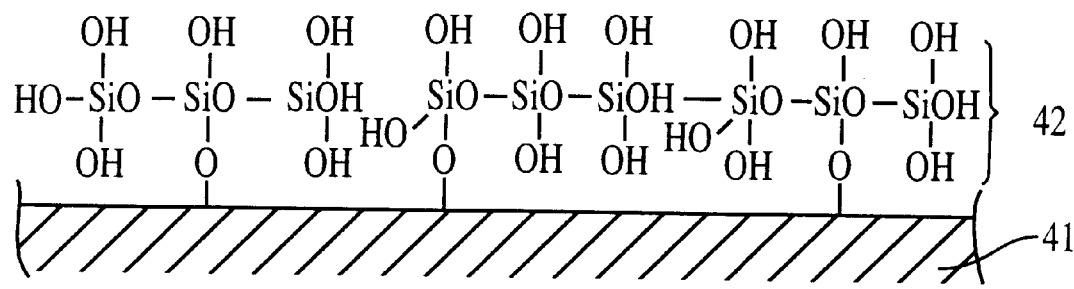

As a substrate, an aluminum plate 41, which had been subjected to the alumite processing, was washed well (cf. FIG. 5(a)). As a chemical absorbent solution, a solution mixture was prepared by using hexaethoxydisiloxane in an amount of 3% and n-decane which was a non-aqueous solvent containing nonactive hydrogen in an amount of 96.5% and dioctyl tin bisoctyl thioglycollic acid ester salt as a silanol-condensing catalyst in an amount of 0.5%. The solution mixture was applied to the surface of aluminum plate 41 in dry atmosphere at room temperature for 2 h to chemically adsorb hexaethoxydisiloxane onto aluminum plate 41. Aluminum plate 41 was washed with a non-aqueous solvent, chloroform to remove an excess amount of unreacted adsorbent off. Remaining unreacted alkoxy groups in the adsorbent were hydrolyzed to form an siloxane-based inner layer 42 covalently bonded to aluminum plate 41 via siloxane bonds (cf. FIG. 5(b)). Inner layer 42 was a chemically adsorbed monomolecular film made from hexaethoxydisiloxane. As illustrated in FIG. 5(b), the above processes provided aluminum plate 41 covered with a number of hydroxyl groups, that is, active hydrogen.

Figure 5C:
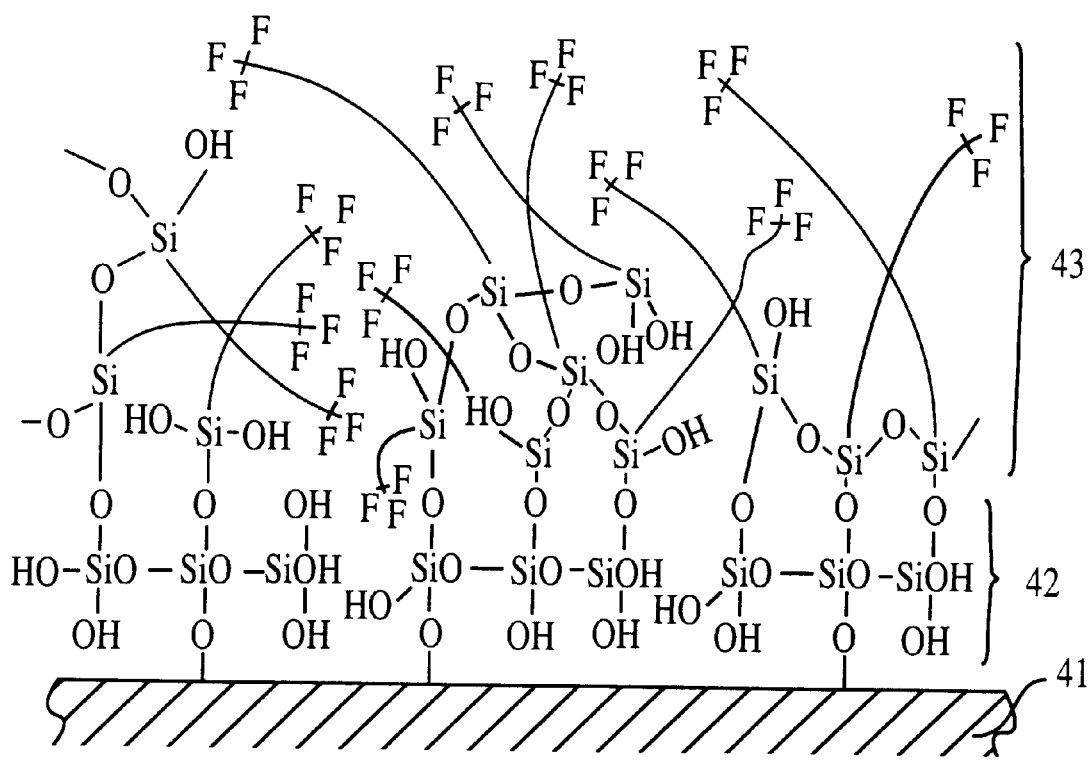

Secondly, another solution mixture was prepared by using fluoroalkoxysilane surface active agent $CF_3(CF_2)_7(CH_2)_2Si(OC_2H_5)_3$ in an amount of 5%, dioctyl tin bisacetyl laurate in an amount of 1% and non-aqueous solvent containing no active hydrogen Fluorinert FC-40 in an amount of 94%. Dioctyl tin bisacetyl laurate was a metal carboxylate chelate as a silanol-condensing catalyst. The solution mixture was heated to 70° C., and the above processed aluminum plate 41 was soaked in the solution mixture in dry atmosphere for 10 min. Aluminum plate 41 was taken out of the adsorbent solution and the solvent in the adsorbent solution remaining on the substrate was evaporated to form a coating of the fluoroalkoxysilane surface active agent containing the silanol-condensing catalyst on the surface of the substrate. In the soaking process, the solution mixture was heated to allow more rapid evaporation of solvents. When the substrate was taken from the solution, alkoxy groups remaining on the substrate reacted with water content in the air to form a water- and oil-repellent coating 43 on the aluminum plate 41. The coating 43 was a polymer film covalently bonded to the surface of the plate via siloxane bonds, and had a thickness of 7 nm (FIG. 5(c)).

The water- and oil-repellent properties of the obtained chemically adsorbed monomolecular accumulation layer was examined in the same manner as in Example 1. The results of the examination are shown in Table 1. As seen from Table 1, the water- and oil-repellent properties of the obtained film were hardly deteriorated even after the plate was repeatedly rubbed with a wet cloth and washed. The obtained-film was found to be an extremely durable coating.

EXAMPLE 5

Figure 6A:
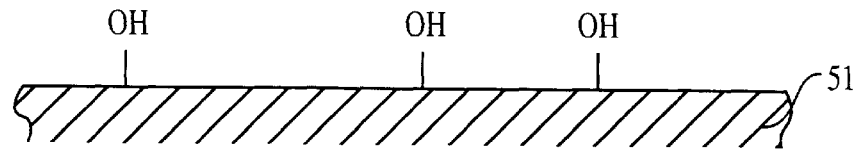
FIGS. 6(a), 6(b) and 6(c) are a cross-sectional view of the surface of a substrate, enlarged to a molecular level, explaining the process of finishing the surface in Example 5 of the invention.
Figure 6B:
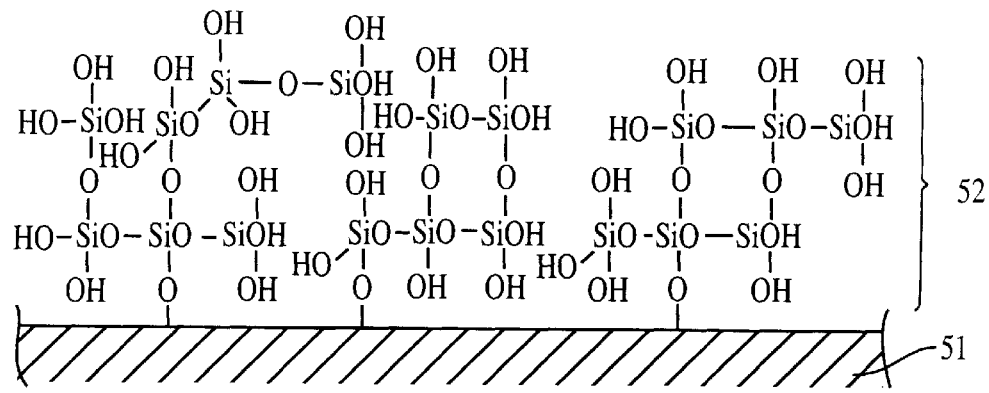

Polysiloxane coat 52 was formed by the following procedures:

preparing paper 51 comprising active hydrogen on its surface and drying it well (FIG. 6(a));

soaking the prepared paper in chemical adsorbent solution, mixture consisting of tetramethoxydisilane (as the first alkoxysilane surface active agent) in an amount of 0.5%, tetrabutyl titanate of titanic ester (as a silanol condensing catalyst) in an amount of 0.1% and Afluid (as a nonaqueous liquid solvent containing no active hydrogens) in an amount of 99.4%, in a gaseous nitrogen atmosphere at the room temperature for 10 minutes; and taking the prepared paper 51 out of the adsorbent solution and evaporating the remained adsorbent solution on the surface of the paper (In this procedure, if the adsorbent solution was heated, the evaporation time could be shortened.); and hydrolyzing the methoxy groups remained on the surface of the prepared paper in the air, thereby forming hydrophilic polysiloxane coating film 52 having thickness of approximately 4 nm on the paper surface (fiber surface) comprising a number of hydroxyl groups via covalent bonding of SiO (FIG. 6(b)).

The contact angle of water for the obtained polymer type siloxane coat 52 was measured in a conventional manner so that contact angle could not be measured at all because of high hydrophilicity. The hydrophilic surface was provided by providing a number of hydroxyl groups on the surface of the paper.

Figure 6C:
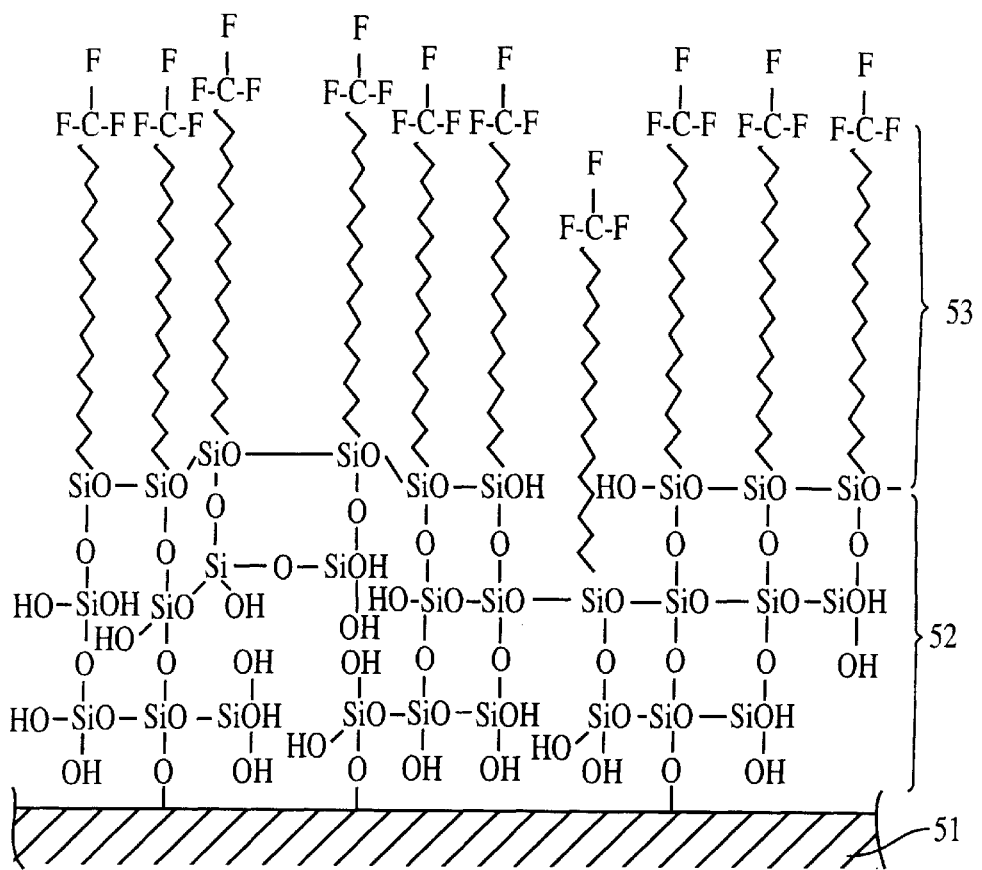

Secondly, another solution mixture was prepared by using second alkoxysilane surface active agent $CF_3(CF_2)_7(CH_2)_2Si(OC_2H_5)_3$ in an amount of 3%, n-dibutyl tin diacetate as a silanol-condensing catalyst in an amount of 0.1%, and non-aqueous solvent containing no active hydrogen, hexadecane in an amount of 94.9%. The mixture solution was applied to the film 52 on the paper 51 in the nitrogen atmosphere. Paper 51 was allowed to stand at the room temperature for 20 minutes. Then the applied mixture solution was washed with chloroform to form an outer layer 53 of chemically adsorbed monomolecular film comprising $CF_3(CF_2)_7(CH_2)_2Si(O-)_3$ covalently bonded to the surface (fiber surface) of the paper 51 via polysiloxane bonding in high density (FIG. 6(c)).

The water and oil repellent properties of the obtained chemically adsorbed film were examined in the same manner as in Example 1. The results of the examination are shown in Table 1. As is apparent from Table 1, the water and oil repellent properties of the obtained films of Example 5 were high. However, the water and oil repellent properties were deteriorated after the paper was rubbed with a wet cloth at 10000 times and washed because the substrate is paper and the surface of a paper is soft and uneven. The durability of the obtained film was also inferior compared to solid substrates.

EXAMPLE 6

Figure 7A:
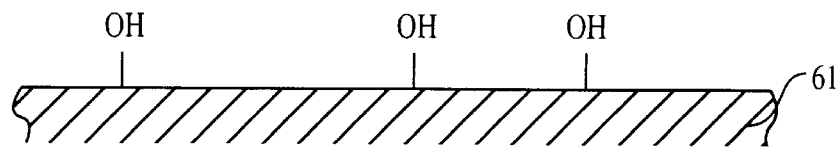
FIGS. 7(a), 7(b) and 7(c) are a cross-sectional view of the surface of a substrate, enlarged to a molecular level, explaining the process of finishing the surface in Example 6 of the invention.
Figure 7B:
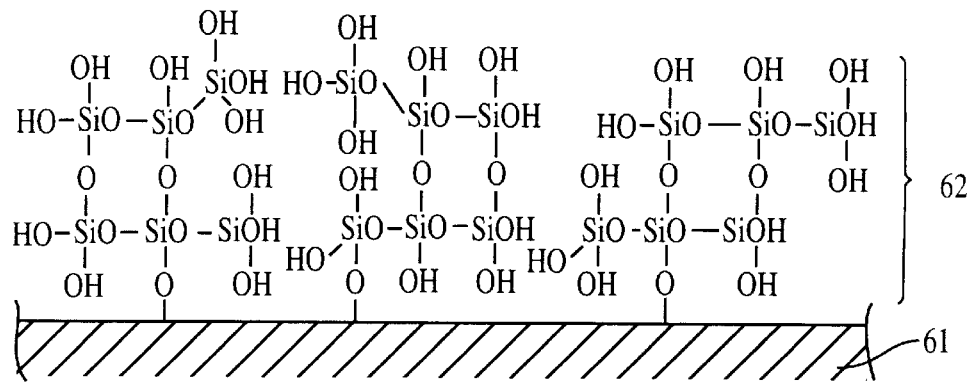

Polysiloxane coating film 62 was formed by the following procedures:

preparing alumina plate 61 which is ceramics and washing it with alkali detergent and degreasing it (FIG. 7(a));

applying to the prepared alumina plate chemical adsorbent solution, a mixture consisting of hexamethoxydisiloxane (as the first alkoxysilane surface active agent) in an amount of 5%, n-dibutyl tin bis-acetyl acetonate of metal carboxylate chelate (as a silanol condensing catalyst) in an amount of 0.5% and n-decane (as a nonaqueous liquid solvent containing no active hydrogens) in an amount of 94.5%, and letting the alumina plate 61 sit for 30 minutes at the room temperature; and evaporating the adsorbent solution remained on the surface of the alumina plate, thereby forming hexamethoxydisiloxane (In this procedure, if adsorbent solution was heated, the evaporation time could be shortened.); and hydrolyzing the methoxy groups remained on the surface of the prepared alumina plate in the air, thereby forming a hydrophilic polysiloxane coat 62 having thickness of approximately 5 nm on the surface of the alumina plate via covalent bonding of SiO (FIG. 7(b)).

Figure 7C:
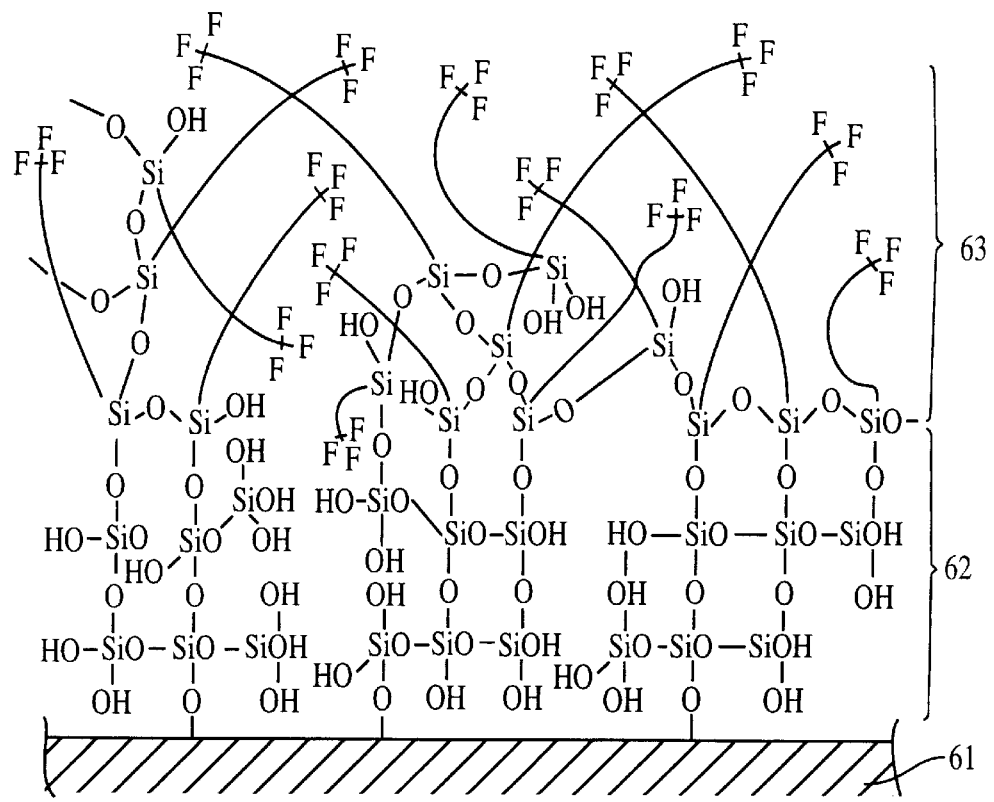

Secondly, another chemically adsorbent solution was prepared by using alkoxysilane surface active agent $CF_3(CF_2)_7(CH_2)_2Si(OC_2H_5)_3$ containing fluorocarbon group in an amount of 5%, dioctyl tin bis-acetyl laurate as a silanol condensing catalyst in an amount of 1%, and nonaqueous solvent containing no active hydrogen Fluorinert FC-40 in an amount of 94%. The alumina plate was taken out of the adsorbent solution in the air and the solution remained on the surface of the plate was evaporated to form the coating comprising a fluoro alkoxysilane surface active agent. If the adsorbent solution was heated, the evaporation of solvent could be quickened. Then, the prepared alumina plate was reacted to the moisture content in the air, thereby forming water and oil repellent polymer-state coating film 63 having a thickness of approximately 6 nm via polysiloxane bonds (FIG. 7(c)).

Moreover, the water and oil repelling property of the chemically adsorbed film formed in this procedures was examined by the same manner as in Example 1. The results are shown in Table 1. As is apparent from Table 1, the water and oil repellent property of the chemically adsorbed polymer coat formed in Example 6 was only minimally deteriorated even after rubbed with a wet cloth 50000 times. Accordingly, a coating film having a high durability was obtained.

COMPARATIVE EXAMPLE 1

The same experiment as in Example 1 was conducted except that the chemically adsorbent solution did not contain di-n-butyl tin diacetate: The results are shown in Table 1. The durability of the obtained coat was practically lost after rubbed at 50000 times.

COMPARATIVE EXAMPLE 1

The same experiment as in Example 4 was directed except that dioctyl tin bis-octyl thioglycollic acid and dioctyl tin bis-acetyl laurate was excluded. The results are shown in Table 1. As in Reference 1, durability of the coat was significantly decreased.

TABLE 1

|  | Contact Angle of Water (°) | | Contact Angle of Oil (°) | |
| --- | --- | --- | --- | --- |
|  | Initial Number | After Rubbing Test | Initial Number | After Rubbing Test |
| Example 1 | 118 | 116 | 98 | 95 |
| Example 2 | 113 | 111 | 94 | 93 |
| Example 3 | 115 | 103 | 93 | 91 |
| Example 4 | 117 | 115 | 96 | 93 |
| Example 5 | 145 | 106 | 108 | 83 |
| Example 6 | 115 | 113 | 95 | 94 |
| Comparative Example 1 | 108 | 48 | 61 | 24 |
| Comparative Example 2 | 105 | 47 | 45 | 16 |

As is apparent from Table 1, the substrate treated with the chemical adsorbent solution of the invention maintained its water and oil repelling or hydrophilic property even after the surface was rubbed repeatedly with a wet cloth. In Comparative Example 1 and Comparative Example 2, water and oil repelling properties were low, and especially the properties were almost completely absent after the rubbing test.

As explained above, the methods of the invention realize a method of forming a chemically adsorbed film which allows practical reaction rates and does not generate hydrochloric acid gas in the process of forming films.

According to the methods of the invention, bi-layer chemically adsorbed films covalently bonded to a surface of the substrate via a siloxane bond can be formed by contacting the substrate with a solution mixture containing an alkoxysilane surface active agent, an active hydrogen-free non-aqueous solvent and a silanol-condensing catalyst. Further, thin films fixed to the substrate due to covalent bonds where substances containing at least one alkoxysilyl group are chemically adsorbed on the surface of the substrate via an Si atom are safely and readily formed by contacting the substrate with a solution mixture containing at least a first alkoxysilane surface active agent, such as dialkoxysilane, trialkoxysilane or tetraalkoxysilane, an active hydrogen-free non-aqueous solvent and a silanol-condensing catalyst to form an inner layer which is a siloxane chemically adsorbed film covalently bonded to a surface of the substrate via a siloxane bond, and contacting the inner layer on the substrate with a solution mixture containing a second alkoxysilane surface active agent, an active hydrogen-free non-aqueous solvent and a silanol-condensing catalyst to form an outer layer which comprises a molecule of the second alkoxysilane surface active agent and is a chemically adsorbed film covalently bonded to a surface of the inner layer via a siloxane bond. In other words, unlike conventional methods, the methods of the invention enable one to efficiently form protection films on a variety of materials such as plastics, ceramics and glass without generating hydrochloric acid gas in forming the films. Therefore, the invention is useful for articles necessitating anti-heat, weather and abrasion thin coatings, such as electrical appliances, household appliances, automobiles, industrial equipment, mirrors, and lenses for glasses.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A chemical adsorbent solution comprising a solution mixture containing an alkoxysilane surface active agent, an active hydrogen-free non-aqueous solvent and a silanol condensing catalyst.

2. The chemical adsorbent solution according to claim 1, wherein said silanol-condensing catalyst is at least one substance selected from the group consisting of metal carboxylate, carboxylic acid ester metal salt, metal carboxylate polymer, metal carboxylate chelate, titanic ester and titanic ester chelate.

3. The chemical adsorbent solution according to claim 1, wherein said silanol-condensing catalyst is at least one substance selected from the group consisting of tin (I) acetate, dibutyl tin dilaurate, dibutyl tin dioctate, dibutyl tin diacetate, dioctyl tin dilaurate, dioctyl tin dioctate, dioctyl tin diacetate, tin (I) dioctanate, lead naphthenate, cobalt naphthenate, iron 2-ethyl hexenoic acetate, dioctyl tin bis-octyl thioglycollic acid ester salt, dioctyl tin maleic acid ester salt, dibutyl tin maleic acid polymer, dimethyl tin mercapto propionic acid salt polymer, dibutyl tin bis-acetyl acetonate, dioctyl tin bis-acetyl laurate, tetrabutyl titanate, tetranonyl titanate and bis-(acetylacetonyl) di-propyltitanate.

4. The chemical adsorbent solution according to claim 1, wherein said alkoxysilane surface active agent comprises a fluorocarbon group.

5. The chemical adsorbent solution according to claim 1, wherein said silane surface active agent comprising a fluorocarbon group is a substance represented by one of the following two formulas:

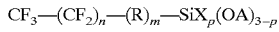

wherein n is 0 or an integer, R represents an alkylene group, vinylene group, ethynylene group, arylene group, or a substituent containing a silicon atom or oxygen atom, m is 0 or 1, X represents an hydrogen atom, alkyl group, alkoxy group, fluorine-containing alkyl group or fluorine-containing alkoxy group, A represents an alkyl group, and p is an integer of 0, 1 or 2; and

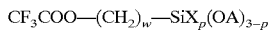

wherein w is an integer, X represents an hydrogen atom, alkyl group, alkoxy group, fluorine-containing alkyl group or fluorine-containing alkoxy group, A represents an alkyl group, and p is an integer of 0, 1 or 2.

6. The chemical adsorbent solution according to claim 1, wherein said non-aqueous solvent is at least one solvent selected from a water-free solvent comprising a hydrocarbon and a water-free solvent comprising a fluorocarbon.

7. The chemical adsorbent solution according to claim 1, wherein said solution mixture has a water content of 10 ppm or less.

8. The chemical adsorbent solution according to claim 1, comprising 0.1 to 30 parts by weight of said alkoxysilane surface active agent, 0.0001 to 7.5 parts by weight of said silanol condensing catalyst, and 62.5 to 99.8999 parts by weight of said active hydrogen-free non-aqueous solvent per 100 parts by weight of said solution mixture.

* * * * *